US012769977B2

(12) United States Patent
Wilkinson

(10) Patent No.: US 12,769,977 B2
(45) Date of Patent: Oct. 20, 2026

(54) ARRANGEMENT AND ASSEMBLY OF A SET OF WRISTBANDS

(71) Applicant: ZEBRA TECHNOLOGIES CORPORATION, Lincolnshire, IL (US)

(72) Inventor: Elaine L. Wilkinson, Preston (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/886,992

(22) Filed: Sep. 16, 2024

(65) Prior Publication Data

US 2025/0013852 A1 Jan. 9, 2025

Related U.S. Application Data

(63) Continuation of application No. 17/319,745, filed on May 13, 2021, now Pat. No. 12,093,770.

(51) Int. Cl.

*G06K 19/077* (2006.01)
*B41J 3/36* (2006.01)
*B41J 3/50* (2006.01)
*B41J 11/66* (2006.01)
*G09F 3/00* (2006.01)

(52) U.S. Cl.

CPC .......... *G06K 19/07762* (2013.01); *B41J 3/36* (2013.01); *B41J 3/50* (2013.01); *B41J 11/663* (2013.01); *G09F 3/005* (2013.01)

(58) Field of Classification Search

CPC ......... G06K 19/07762; B41J 3/36; B41J 3/50; B41J 11/663; B41J 11/46; B41J 3/407; G09F 3/005; G09F 3/14

See application file for complete search history.

(56) References Cited

U.S. PATENT DOCUMENTS 5,364,133 A 11/1994 Hofer
5,799,426 A 9/1998 Peterson
6,510,634 B1 1/2003 Riley
(Continued)

FOREIGN PATENT DOCUMENTS

CN 201757958 3/2011
CN 202230671 5/2012
(Continued)

OTHER PUBLICATIONS

International Search Report and Written Opinion for International Application No. PCT/US2022/28912 mailed on Aug. 16, 2022.
(Continued)

*Primary Examiner* — Cassandra Davis

(57) ABSTRACT

An arrangement and/or assembly of a set of wristbands is disclosed. In some implementations, an arrangement of a set of wristbands may include a first wristband formed from a first portion of the wristband web. The arrangement may include a second wristband formed from a second portion of the wristband web. The first length of the first wristband may be different from a second length of the second wristband. The arrangement may include a cut formation, in the wristband web, that is between the first wristband and the second wristband. The cut formation may be configured to enable the first wristband to be separated from the second wristband.

14 Claims, 6 Drawing Sheets

(56) References Cited

U.S. PATENT DOCUMENTS

| | | | | |
|---|---|---|---|---|
| 8,495,829 | B2 | 7/2013 | Bekker | |
| 10,672,299 | B2 * | 6/2020 | Amami | G09F 3/005 |
| 12,093,770 | B2 | 9/2024 | Wilkinson | |
| 2003/0177681 | A1 | 9/2003 | Riley | |
| 2005/0091896 | A1 | 5/2005 | Kotik et al. | |
| 2005/0108912 | A1 * | 5/2005 | Bekker | G09F 3/005 40/633 |
| 2006/0182920 | A1 * | 8/2006 | Craig | G09F 3/0297 428/40.1 |
| 2008/0236011 | A1 | 10/2008 | Bekker | |
| 2010/0253060 | A1 | 10/2010 | Riley | |
| 2012/0285058 | A1 | 11/2012 | Bekker | |

FOREIGN PATENT DOCUMENTS

| | | | |
|---|---|---|---|
| CN | 203276717 | | 11/2013 |
| EP | 2782088 | A1 | 9/2014 |
| GB | 1227497 | | 4/1971 |
| JP | H0810014 | A | 1/1996 |
| JP | 2012061132 | | 3/2012 |
| JP | 2013127614 | | 6/2013 |
| JP | 2016020984 | | 2/2016 |
| WO | 2009122257 | | 10/2009 |
| WO | 2013073123 | | 5/2013 |

OTHER PUBLICATIONS

Examination report from the Intellectual Property Office of the United Kingdom dated Sept. 9, 2025.

Examination report from German Patent Application No. 10 2022 111 204.7 dated Apr. 29, 2026.

* cited by examiner

ARRANGEMENT AND ASSEMBLY OF A SET OF WRISTBANDS

RELATED APPLICATIONS

The present application is a continuation of U.S. patent application Ser. No. 17/319,745, filed on May 13, 2021, which is incorporated by references herein in its entirety.

TECHNICAL FIELD

The present disclosure relates generally to wristbands and, for example, to an arrangement and/or an assembly of a set of wristbands.

BACKGROUND

A disposable wristband can be used in a variety of applications. For example, such a wristband can be utilized for verification and/or authorization of access or entry to a secure area, such as a hospital, entertainment venue, and/or a restaurant, among other examples. Further, to enable universal use and reduce waste, the wristband may be arranged for certain ages of wearers and/or adjustable to comfortably fit a wearer's wrist. In some cases, multiple wristbands are to be customized and/or configured to remain as a set (e.g., to indicate a relationship between individual wearers of wristbands from the set of wristbands). Accordingly, there is a need for an arrangement and/or an assembly of a set of wristbands, of various sizes, that is capable of indicating a relationship (e.g., using a unique identifier) between wearers of the wristbands. Further, the arrangement and/or assembly of the set of wristbands are to ensure that the set of wrist bands are maintained as a set until the wristbands from the set are to be individually worn by different wearers (so that the wearers can be identified as being in the relationship).

DETAILED DESCRIPTION

Figure 1:
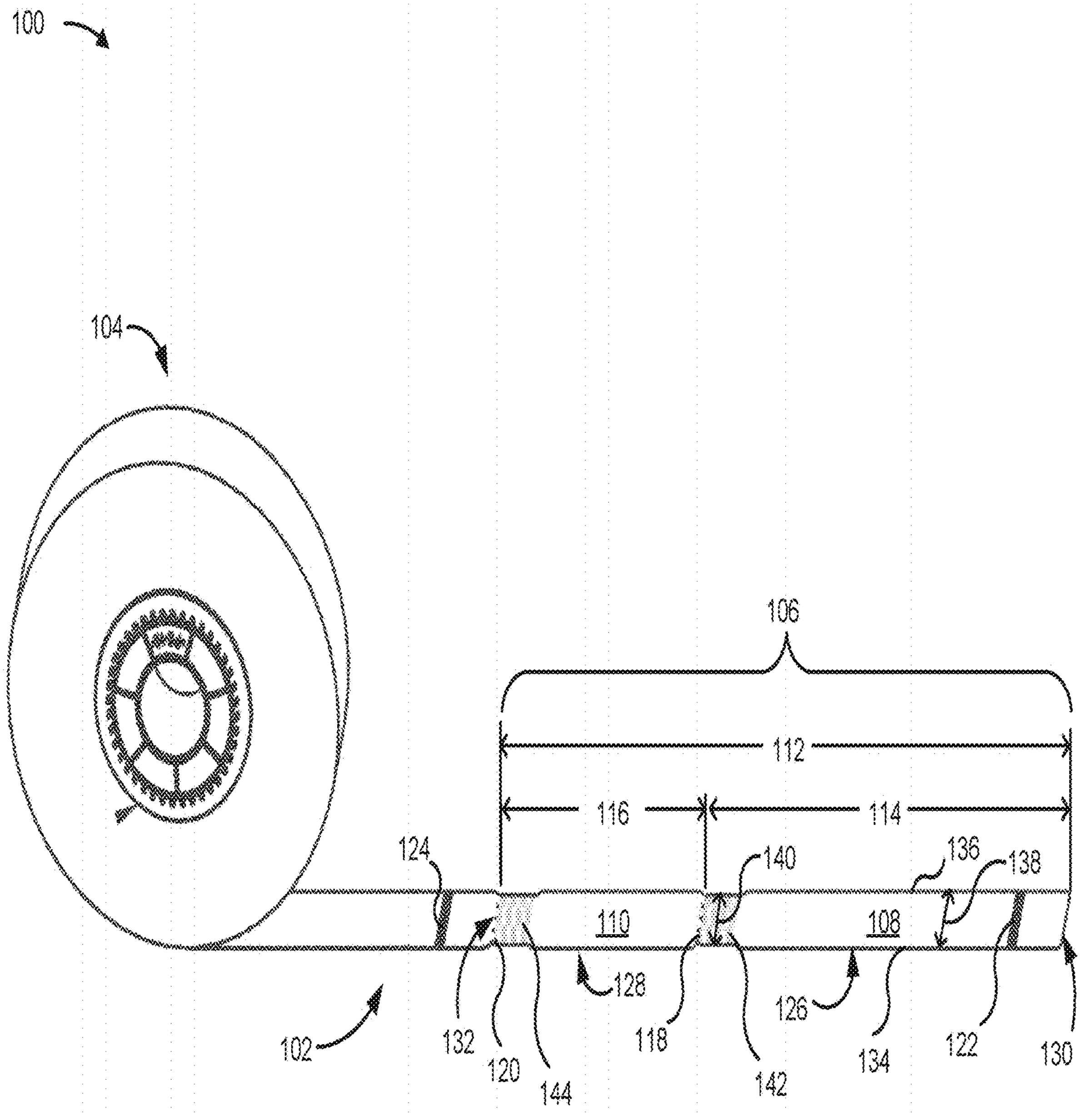
FIG. 1 is a diagram of an example implementation of an arrangement of a set of wristbands described herein.

The following detailed description of example implementations refers to the accompanying drawings. The same reference numbers in different drawings may identify the same or similar elements.

In some instances, a wristband may be configured to provide (e.g., via a printed label and/or a radio frequency identification (RFID) tag) or indicate information associated with a wearer of the wristband. For example, the wristband may be a disposable wristband or other type of wristband that is intended for temporary or relatively short term use by an individual or organization. Accordingly, the wristbands may be configured on-demand, for example, by printing a label (or other content) onto the wristband that indicates an intended use or purpose of the wristband. As a more specific example, a wristband may be created and/or printed to identify a patient or an account of a patient while the patient is admitted to a hospital.

In certain situations, multiple wristbands may need to be provided as a set of wristbands. Furthermore, individual wristbands within such a set may need to vary in size (e.g., with one wristband in the set being a first length and a second wristband being a second length that is 75% of the first length or less than 75% of the first length). For example, referring to the hospital example above, a set of wristbands may be configured for a parent admitted to the hospital and a newborn child that is born at the hospital. The individual wristbands, of the set of wristbands, may be configured to indicate (e.g., via a same printed family identifier on the individual wristbands) a relationship between the parent and the newborn child. In such a case, there may be a need or desire to keep the individual wristbands as a cohesive set (e.g., attached to one another) to prevent one or more of the wristbands in the set from being misplaced, lost, or unintentionally replaced, within the set, by another wristband (e.g., a wristband configured for another patient).

In some cases, such a set of wristbands can be obtained from a sheet of material that holds the individual wristbands side-by-side (or lateral to one another length-wise) within the set and/or multiple sets of wristbands side-by-side within the sheet. The individual wristbands and/or sets of wristbands may be formed by a relatively complex configuration of cut formations (e.g. perforated cuts or other types of partial cut patterns) within the sheet that may be caused by the variation in sizes of the wristbands. Further, because individual wristbands or sets of wristbands may be adjacent to other wristbands or other sets of wristbands within the sheet, an individual wristband can be unintentionally separated from a designated set of the individual wristband. For example, when intending to separate a first set of wristbands from the sheet or from a second set of wristbands in the sheet, a user may unintentionally detach an adjacent wristband from the second set of wristbands. This can cause confusion if a wearer (e.g., a newborn or child) unintentionally receives the adjacent wristband from the second set that does not accurately identify a relationship of the first set of wristbands. Accordingly, the wearer can be misidentified by the wristband. Additionally, or alternatively, this can lead to unnecessary waste (e.g., the second set may need to be discarded) because the adjacent wristband was not maintained within the second set. Furthermore, due to the complex configuration of cuts within the sheet that forms the wristbands, a user's ability to remove the set of wristbands from the sheet and/or detach the set of wristbands from another set of wristbands can be relatively difficult (e.g., because various amounts of force or directions of force may be required to separate the set of wristbands). More specifically, the complex configuration of cuts may involve cut patterns with multiple corners or turns that cause difficulty with respect to tearing the set of wristbands from the sheet and/or, correspondingly, contribute to difficulty with respect to maintaining the individual wristbands of a set as an intended cohesive set until the wristbands are to be separated from one another (e.g., which is ideally when the wristbands are in the presence of one or more of the wearers so that).

Some implementations described herein provide an arrangement and an assembly of a set of wristbands that is configured to indicate a relationship between wearers of individual wristbands within the set. Furthermore, the arrangement and assembly is configured to provide a set of wristbands that are to be created and maintained as a set (e.g., attached together as a unit) for a period of time that is between the set of wristbands being created and individual wristbands of the set being received by individual wearers associated with the relationship. As described herein, a set of wristbands (e.g., a set of disposable wristbands) can be obtained or formed from a wristband web and/or a cartridge that holds or houses a wristband web. The wristband web may be in the form of a tape, a ribbon, and/or a roll of material that forms the wristband web. Accordingly, the individual wristbands in the set of wristbands may be aligned end-to-end and/or configured to abut one another along a length of the wristband web (e.g., longitudinally rather than laterally as discussed in connection with the wristband sheet). The wristband web may be manufactured to include and/or hold multiple sets of wristbands that are configured to be individually removed or separated from the wristband web as an individual set (e.g., from a material(s) that forms the wristband web and/or a cartridge that holds the wristband web) that is maintained until the individual wristbands of the set are to be worn by individual wearers. To maintain the wristbands as a set until the wristbands are to be worn, the wristband web can be formed of one or more layers of material that include one or more cuts that form the individual sets of wristbands and/or one or more cuts that form the individual wristbands in a set of wristbands.

According to some implementations, the arrangement and/or assembly of a set of wristbands being aligned along the length of the wristband web enables a single wristband printer (or other type of printing device) to print individual wristbands of different lengths as a set. For example, for a first wristband with a first length and a second wristband with a second length that is different than the first length, the wristband printer may be configured to print a first label (or other content) on the first wristband and a second label on a second wristband, and output (e.g., eject or release) the first wristband and the second wristband as a set of wristbands that can be maintained (e.g., attached together) until the first wristband is to be received (e.g., worn) by a first wearer or the second wristband is to be received by a second wearer. In this way, the arrangement and/or assembly of the set of wristbands allows for a single wristband printer (rather than separate wristband printers for different wristband sizes) to print the set of wristbands from a single feeding mechanism. Accordingly, the arrangement and/or assembly allows for a wristband printer to be configured with relatively reduced resources, by preventing the need for separate feeding mechanisms, such as separate feeding trays that hold different sized wristbands or other types of feeding mechanisms that are more complex than a single wristband printer with a single feeding mechanism and/or that require additional hardware (e.g., components for powering and/or communicating with the separate feed mechanisms and/or materials used for multiple feeding mechanisms).

In this way, an example arrangement and/or example assembly of a set of wristbands that is configured as described herein, may permit a user to print the set of wristbands (e.g., using a single print instruction) so that a first wristband and a second wristband both include a same relationship identifier and can be obtained by the user as a set (e.g., because the wristband printer outputs the wristbands as a set or according to a single print instruction). The user (e.g., a nurse or other representative of the hospital) may obtain the first wristband and the second wristband as a set from the wristband printer, which is configured to output the set of wristbands with the first wristband attached to the second wristband (e.g., by obtaining the set of wristbands from the wristband printer output and/or by separating or tearing the set of wristbands from the wristband web with the first wristband attached to the second wristband). The user may ensure that the set of wristbands are received by a first patient and a second patient associated with the relationship identifier (e.g., a parent and a child that share a family identifier or name) by delivering the set of wristbands with the first wristband still attached to the second wristband to the first patient and/or the second patient. Accordingly, once delivered, the user can be assured that the first patient and the second patient can be accurately identified by relationship identifier via the first patient wearing the first wristband and the second patient wearing the second wristband (e.g., after the first wristband is separated from the second wristband).

In some implementations, an arrangement of a set of wristbands on a wristband web includes a first wristband formed from a first portion of the wristband web; a second wristband formed from a second portion of the wristband web, wherein a first length of the first wristband is different from a second length of the second wristband; and a cut formation, in the wristband web, that is between the first wristband and the second wristband, wherein the cut formation is configured to enable the first wristband to be separated from the second wristband.

In some implementations, a wristband web includes a first set of wristbands formed from a first section of the wristband web, wherein the first set of wristbands includes: a first wristband having a first length, and a second wristband having a second length that is different from the first length; and a second set of wristbands formed from a second section of the wristband web that is adjacent the first section of the wristband web, wherein the second set of wristbands includes: a third wristband having the first length, and a fourth wristband having the second length.

In some implementations, a wristband cartridge includes a wristband material that includes multiple sets of wristbands, wherein a set of wristbands of the multiple sets of wristbands includes a first wristband having a first length and a second wristband having a second length, wherein a cut formation is disposed between the first wristband and the second wristband; and a controller configured to facilitate printing on the first wristband and the second wristband according to a print instruction.

FIG. 1 is a diagram of an example implementation 100 associated with an arrangement of a set of wristbands (which may be referred to herein as a "wristband web arrangement"). As shown in FIG. 1, example implementation 100 includes a wristband material in the form of a wristband web 102. As shown, the wristband web 102 may be supported on (e.g., coiled around and/or housed within) a spool 104. The spool 104 may be suitably configured to supply the wristband web 102 to any suitable printer, such as a wristband printer described elsewhere herein. The wristband web 102 may include multiple sets of wristbands. An example set of wristbands 106 of example implementation 100 includes a first wristband 108 and a second wristband 110 (which may be referred to herein collectively as "the wristbands" in connection with FIG. 1). Other sets of wristbands (e.g., other sets of wristbands that are a same arrangement as the set of wristbands 106) may be similarly arranged along and/or form a remainder of the wristband web 102 that is coiled around and/or housed within the spool 104.

As shown in FIG. 1, the first wristband 108 may be formed from a first portion of the wristband web 102 and the second wristband 110 may be formed from a second portion of the wristband web 102. For example, the first wristband 108 and the second wristband 110 may be formed from a wristband material that forms the wristband web 102. The wristband material, depending on desired characteristics (e.g., functionality, aesthetics, durability, and/or strength) may include one or more layers of material, such as one or more layers of plastic material, one or more layers of silicon-based material, one or more layers of rubber material, one or more layers of paper material, and/or one or more layers of adhesive material, among other examples.

As shown in FIG. 1, the set of wristbands 106 has an overall length 112, the first wristband 108 has a first length 114, and the second wristband 110 has a second length 116. Furthermore, the first wristband 108 is aligned with (or adjacent to) the second wristband 110 (e.g., along a length of the wristband web 102), such that an end of the first wristband 108 abuts an end of the second wristband 110. Accordingly, a sum of the first length 114 and the second length 116 may be equal to the overall length 112 of the set of wristbands 106.

As shown in FIG. 1, the first wristband 108 may have a different length from the second wristband 110. For example, as shown, the first wristband 108 may have a length to fit a wrist (or ankle) of a relatively larger individual (e.g., an adult, such as a parent of a child that is to wear the second wristband 110), and the second wristband 110 may have a length to fit a relatively smaller individual (e.g., a child or infant of a parent that is to wear the first wristband 108). In some implementations, the width of the first wristband 108 may be different from the width of the second wristband 110, and/or the thickness of the first wristband 108 may be different from the thickness of the second wristband 110. In this way, a set of wristbands may include multiple wristbands, at least two of which have different dimensions or sizes, to permit a group of individuals (e.g., wearers of the wristbands) with different sized wrists (or ankles) to comfortably receive (or wear) individual wristbands of the set of wristbands.

In some implementations, one or more cut formations may be formed, in the wristband web 102, such as one or more perforated cuts or one or more other types of partial cut patterns. For example, a first cut formation 118 may be disposed between the first wristband 108 and the second wristband 110 (e.g., adjacent to the first wristband 108 and the second wristband 110) within the set of wristbands 106. The first cut formation 118 may be configured to maintain the first wristband 108 and the second wristband 110 within the set of wristbands 106 (e.g., until the first wristband 108 is to be received by a wearer and/or until the second wristband 110 is to be received by a wearer) and/or enable separation between the first wristband 108 and the second wristband 110. For example, the first cut formation 118 may include one or more ties of a perforated cut. The one or more ties may include material that is between through cuts of the perforated cut that fully penetrate the wristband web. Accordingly, the one or more ties may be configured in manner (e.g., have certain dimensions) that provides a bond between the first wristband 108 and the second wristband 110 (e.g., to maintain the first wristband 108 and the second wristband 110) until one or more forces are applied to or across the one or more ties (e.g., to tear the ties, thereby enabling separation of the first wristband 108 and the second wristband 110). The one or more forces may correspond to a predetermined amount of opposing forces being applied between the wristbands that is designed to enable separation of the first wristband 108 and the second wristband 110. Additionally, or alternatively, the one or more forces may include a predetermined amount of force being applied along the first cut formation 118 that is configured to permit the first wristband 108 to be torn from the second wristband 110 (or vice versa). In this way, the first cut formation 118 may enable the first wristband 108 to be separated from the second wristband 110 (or vice versa) and/or may facilitate separation of the first wristband 108 and the second wristband 110 from one another.

As mentioned above, the wristband web 102 may include multiple sets of wristbands. For example, the set of wristbands 106 may correspond to a first set of wristbands that is formed from a first section of the wristband web 102, and the wristband material may include a second set of wristbands that is formed from a second section of the wristband web 102. In some implementations, each of the multiple sets of wristbands on the wristband web 102 may include a same arrangement of wristbands. Correspondingly, a second wristband arrangement may include a third wristband that has the first length 114 and a fourth wristband that has the second length 116. In some implementations, a second cut formation 120 may be disposed between the set of wristbands 106 and another set of wristbands on the wristband web (e.g., between the second wristband 110 and an adjacent wristband of the second set of wristbands). The second cut formation 120 may facilitate separation of the set of wristbands 106 from the other set of wristbands (e.g., from an adjacent wristband of the set of wristbands) and/or from a remainder of the wristband web 102.

In some implementations, one or more print markings may be included and/or arranged on the wristband web 102 to facilitate printing content on one or more of the sets of wristbands. For example, the set of wristbands 106 includes a first print marking 122 and a second print marking 124. The first print marking 122 may indicate a print area of the set of wristbands 106 and the second print marking 124 may indicate a print area of another set of wristbands (e.g., a set of wristbands that are wrapped around the spool 104). For example, the first print marking 122 may trigger a wristband printer to identify a first print surface 126 of the first wristband 108 (e.g., that is to receive identification information associated with a first wearer of the first wristband 108) and a second print surface 128 of the second wristband 110 (e.g., that is to receive identification information associated with a second wearer of the second wristband 110). Additionally, or alternatively, the second print marking 124 may trigger the wristband printer to end a printing operation associated with the set of wristbands 106 (e.g., to stop an output feed mechanism of the wristband printer). As shown, the first cut formation 118 and the second cut formation 120 are between the first print marking and the second print marking 124. Accordingly, multiple cut formations associated with the set of wristbands (e.g., cut formations that permit the wristbands from being separable from one another and/or the set of wristbands 106 from being separable from another set of wristbands) may be between the first print marking 122 and the second print marking 124.

As shown in FIG. 1, one or more print markings may be disposed on the wristband material between adjacent sets of wristbands of the multiple sets of wristbands. For example, the first print marking 122 may be disposed at a leading end 130 of the set of wristbands 106 that is configured to be fed into a printing mechanism of the wristband printer prior to a trailing end 132 of the set of wristbands 106 (e.g., to indicate to a sensor or controller of the wristband printer that the set of wristbands 106 is being fed into the printing mechanism). The leading end 130 may correspond to an end of the first wristband 108 and the trailing end 132 may correspond to an end of the second wristband 110. The wristband printer may be configured to print content to the first wristband 108 and/or the second wristband 110 based on sensing and/or detecting the first print marking 122. Accordingly, the first print marking 122 may be disposed toward an end of the first wristband 108 that is opposite the first cut formation 118 (e.g., relative to the end of the first wristband that is formed by the first cut formation 118) and/or at an end of the set of wristbands 106 that is opposite an end of the set of wristbands 106 that is formed by the second cut formation 120. In some implementations, one or more additional print markings may be included within the set of wristbands (e.g., on the second wristband 110 toward the first cut formation to indicate a print area of the second wristband 110).

A location of the cut formation 118 within the set of wristbands 106 may define the first length 114 and the second length 116. As shown, the cut formation 118 may be perpendicular to a longitudinal direction (or longitudinal axis) of the set of wristbands 106. Accordingly, unless the cut formation 118 is centered between the leading end 130 and the trailing end 132, the first length 114 is different from the second length 116.

In some implementations, one or more dimensions of the wristband web may correspond to one or more dimensions of the wristbands of the set of wristbands 106. For example, the set of wristbands 106 may have a first edge contour 134 and a second edge contour 136 that extend along a longitudinal direction of the wristband web. The first edge contour 134 and the second edge contour 136 may form a maximum wristband width 138 and a minimum wristband width 140. Correspondingly, the first wristband 108 (and/or the second wristband 110) may include the first edge contour 134 and/or the second edge contour 136. Therefore, widths of one or both of the wristbands in the set of wristbands 106 may correspond to (or depend on) the maximum wristband width 138 of the wristband web 102 (and/or the wristband material) and the minimum wristband width 140. In this way, the first wristband 108 and/or the second wristband 110 may have a maximum width and/or a minimum width that is defined by the first edge contour 134 and the second edge contour 136. Additionally, or alternatively, a maximum thickness of one or both of the wristbands may correspond to a maximum thickness of the wristband web 102.

The set of wristbands 106 may include one or more adhesive sections (e.g., portions of the wristband web that include an adhesive, such as a glue or other type of adhesive). An adhesive section may permit an individual wristband of the set of wristbands 106 to be worn by a wearer (e.g., by applying the adhesive section to another surface of the individual wristband after the individual wristband is wrapped around a wrist of the wearer). As shown in FIG. 1, the first wristband 108 may include a first adhesive section 142, and the second wristband 110 may include a second adhesive section 144. In some implementations, a width of the first adhesive section 142 and/or the second adhesive section 144 is less than the maximum wristband width 138 of the set of wristbands 106. For example, a maximum width of the first adhesive section 142 may correspond to the minimum wristband width 140. Accordingly, the first adhesive section may be narrower than a maximum width (e.g., the maximum wristband width 138) of the first wristband 108 and the second adhesive section 144 may be narrower than a maximum width of the second wristband 110. Furthermore, as shown, the first adhesive section 142 and the second adhesive section 144 are disposed between the first print marking 122 and the second print marking 124. Accordingly, the set of wristbands 106 may include multiple adhesive sections between print markings on the wristband web.

In some implementations, the wristband printer may be configured to print a relationship identifier onto the first print surface 126 and second print surface 128 that indicates a relationship (e.g., a familial relationship, a custodial relationship, and/or any other group-type relationship) between wearers of the first wristband 108 and the second wristband 110. For example, the relationship identifier may include a last name of a parent that is to wear the first wristband 108 and a child that is to wear the second wristband 110 to permit a representative of a hospital to verify that the parent and the child are related patients of the hospital.

Figure 2:
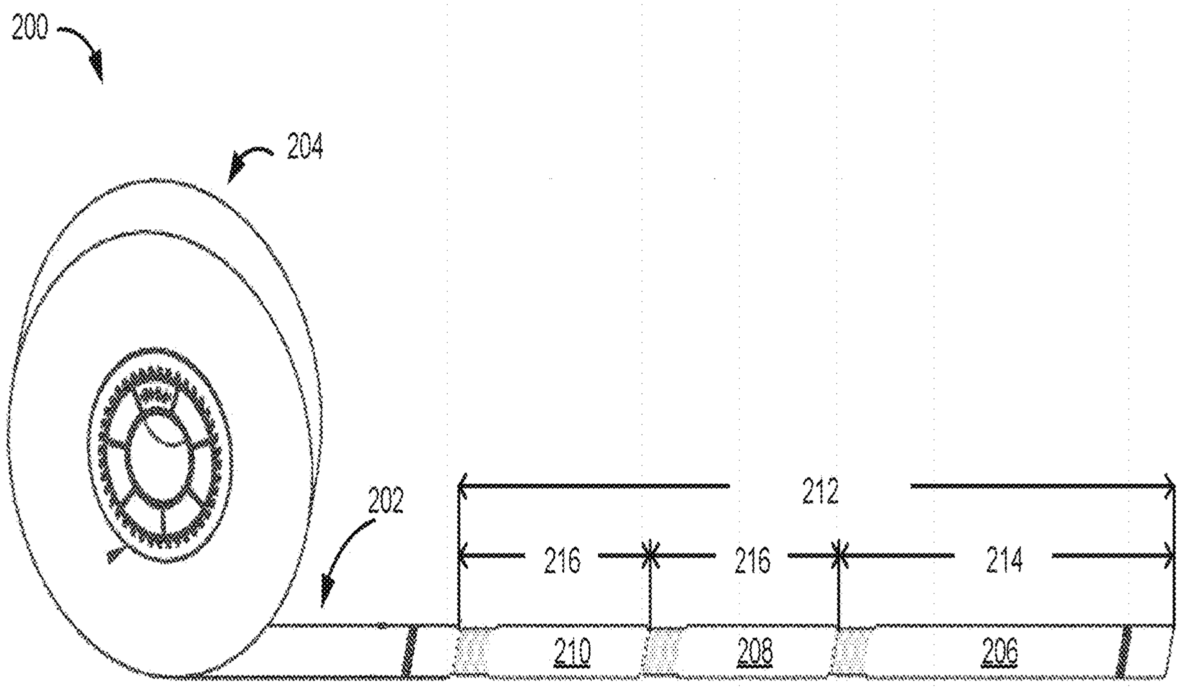
FIG. 2 is a diagram of an example implementations of a set of wristbands described herein.

FIG. 2 is a diagram of one or more example implementations of a set of wristbands 200 described herein. The set of wristbands 200 may be included on a wristband material and/or a wristband web 202 of a spool 204 (e.g., similar to the wristband web 102 of FIG. 1). As shown in FIG. 2, the set of wristbands 200 may include a first wristband 206, a second wristband 208, and a third wristband 210. The set of wristbands 200 has an overall length 212. The first wristband 206 has a first length 214. The second wristband 208 and the third wristband 210 have a second length 216. Accordingly, the overall length 212 may equal the first length 214 plus twice the second length 216. As shown, the first length 214 is relatively longer than the second length 216. For example, the set of wristbands 200 may be configured to provide individual wristbands for a parent (e.g., the first wristband 206) and twin infants (e.g., the second wristband 208 and the third wristband 210). Similar to the wristband web 102 of FIG. 1, the wristband web 202 may include multiple sets of wristbands that are configured and/or arranged according to the set of wristbands 200.

Figure 3:
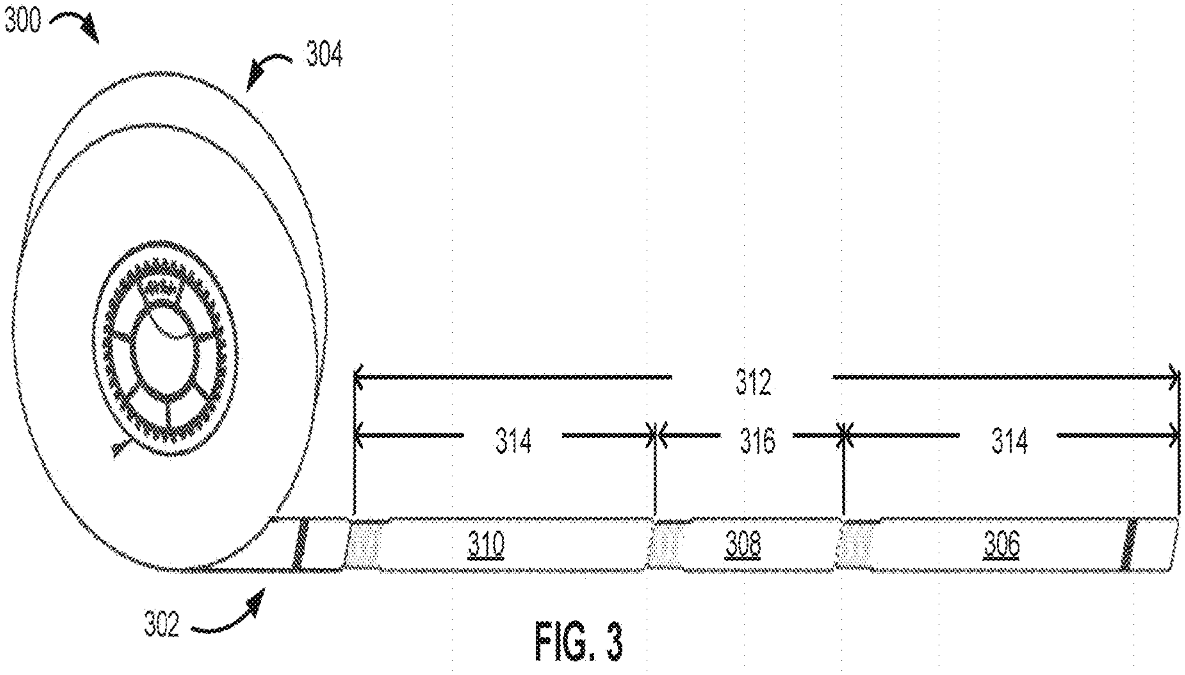
FIG. 3 is a diagram of an example implementations of a set of wristbands described herein.

FIG. 3 is a diagram of one or more example implementations of a set of wristbands 300 described herein. The set of wristbands 300 may be included on a wristband material and/or a wristband web 302 of a spool 304 (e.g., similar to the wristband web 102 of FIG. 1). As shown in FIG. 3, the set of wristbands 300 may include a first wristband 306, a second wristband 308, and a third wristband 310. The set of wristbands 300 has an overall length 312. The first wristband 306 and the third wristband 310 have a first length 314. The second wristband 308 has a second length 316. Accordingly, the overall length 312 may equal twice the first length 314 plus the second length 316. As shown, the first length 314 is relatively longer than the second length 316. For example, the set of wristbands 300 may be configured to provide individual wristbands for two parents (e.g., the first wristband 306 and the third wristband 310) and an infant (e.g., the second wristband 308). Similar to the wristband web 102 of FIG. 1, the wristband web 302 may include multiple sets of wristbands that are configured and/or arranged according to the set of wristbands 300.

As indicated above, FIGS. 1-3 are provided as examples. Other examples may differ from what is described with regard to FIGS. 1-3. The number and arrangement of elements shown in FIGS. 1-3 are provided as an example. In practice, there may be additional elements, fewer elements, different elements, or differently arranged elements than those shown in FIGS. 1-3.

Figure 4:
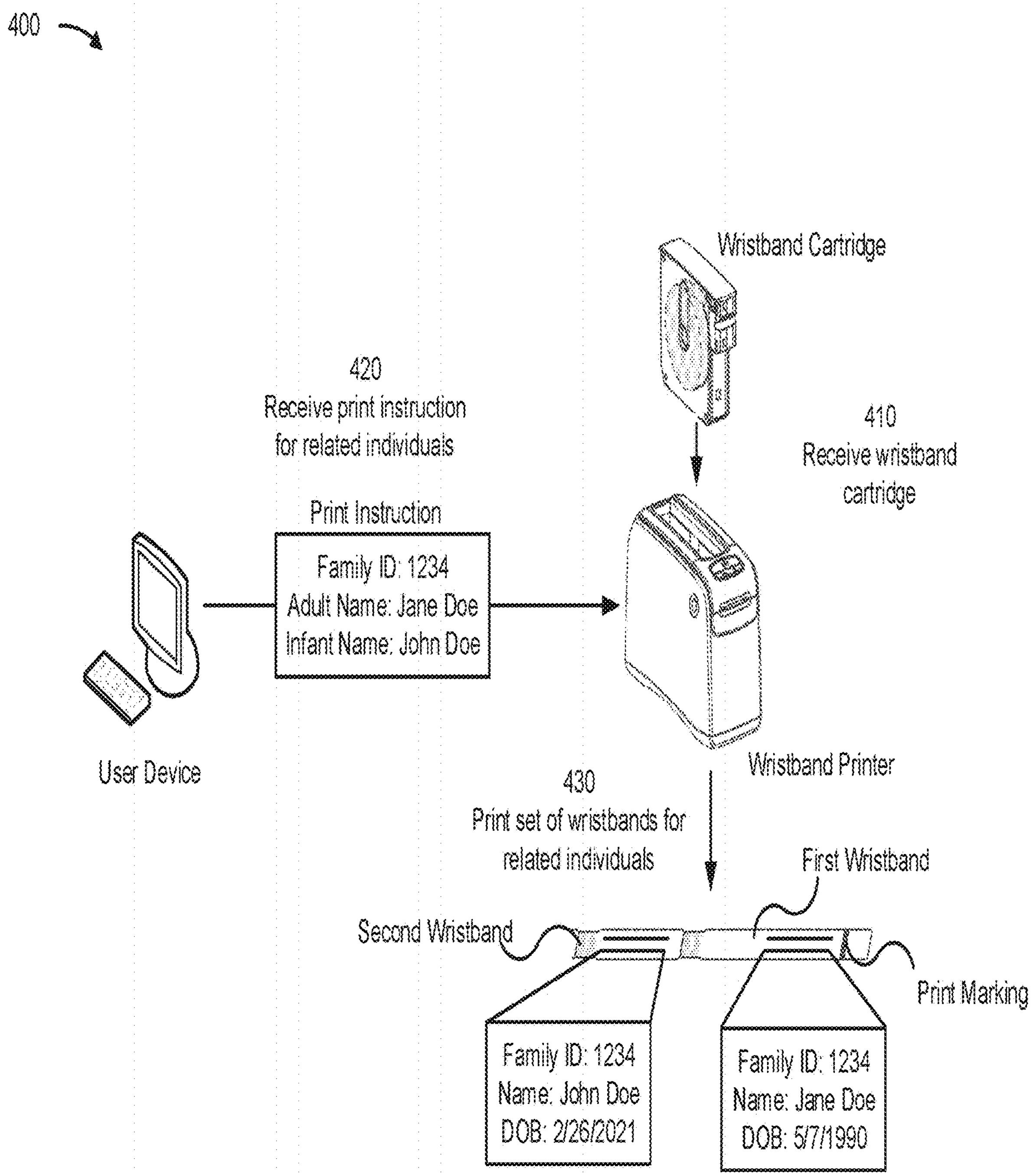
FIG. 4 is a diagram of an example implementation of an assembly of a set of wristbands described herein.

FIG. 4 is a diagram of an example implementation 400 of an assembly of a set of wristbands described herein. As shown in FIG. 4, example implementation 400 includes a wristband cartridge, a wristband printer, and a user device. These devices are described in more detail below in connection with FIG. 5 and FIG. 6.

The wristband cartridge of FIG. 4 may include a wristband material that includes multiple sets of wristbands described elsewhere herein. For example, the wristband material may include a wristband web, a roll of wristband web (e.g., on a spool), a stacked arrangement of sets of wristbands, and/or the like.

As shown in FIG. 4, and by reference number 410, the wristband printer receives the wristband cartridge. The wristband cartridge may include any suitable components that are configured to permit the wristband printer to print content to the sets of wristbands. For example, the wristband cartridge may include a controller that is configured to communicate information associated with the print areas of the sets of wristbands and/or individual print surfaces of individual wristbands. Based on detecting that the cartridge has been installed in the wristband printer (e.g., based on detecting a connection to a controller of the wristband printer), the cartridge may provide the information to the wristband printer.

The information may including a mapping of content of a print instruction to corresponding print fields of the sets of wristbands that are to receive certain portions of the content. For example, the mapping may indicate that a relationship identifier of a print instruction is to be received by both a first wristband and a second wristband of a set of wristbands (or all wristbands of a set of wristbands), while other information (e.g., unique information, such as a name or date of birth (DOB) is to be received in respective print fields of the respective wristbands. In some implementations, the print cartridge may indicate, to the wristband printer timing for printing and/or location(s) of print field(s) on the print area of a set of wristbands relative to a print marking or other features (e.g., edges, boundaries, cut formations, adhesive sections, and/or the like) of the set of wristbands. Additionally, or alternatively, the information may indicate areas (e.g., relative to the print marking) on which the set of wristbands are not to receive printable content (e.g., adhesive areas that may be removable or areas of the wristbands that may be hidden when worn by an individual).

In this way, based on receiving the wristband cartridge, the wristband printer may be configured to receive and/or print to a set of wristbands based on information from the controller of the cartridge.

As further shown in FIG. 4, and by reference number 420, the wristband printer receives a print instruction associated with related individuals. The print instruction may be received from the user device. The print instruction may be configured to cause the wristband printer to print and/or output a set of wristbands for an adult (named "Jane Doe") and an infant (named "John Doe"). More specifically, the print instruction may identify content that is to be printed to individual wristbands of the set of wristbands. For example, the print instruction may indicate that a relationship identifier "1234" is to be printed in a "Family ID" field of a first wristband for the adult and a second wristband for the child. Correspondingly, the print instruction may indicate that the name of the adult ("Jane Doe") and date of birth (DOB) of the adult ("May 7, 1990") is to be printed to a "Name" field and a "DOB" field of the first wristband, respectively. Furthermore, the print instruction may indicate that the name of the child ("John Doe") and DOB of the child ("Feb. 26, 2021") is to be printed to a "Name" field and a "DOB" field of the second wristband, respectively.

As further shown in FIG. 4, and by reference number 430, the wristband printer prints the set of wristbands for the related individuals. For example, as shown, the wristband printer may output the set of wristbands to include the first wristband and the second wristband. In some implementations, the wristband printer may output the first wristband and the second wristband according to a single print instruction. Correspondingly, the wristband printer may map information of the print instruction to corresponding fields of the individual wristbands of set of wristbands. For example, a controller of the wristband cartridge may indicate that the relationship identifier is to be printed on a portion of the first wristband and the second wristband that is designated for the "Family ID" field. Additionally, or alternatively, the controller of the wristband cartridge may indicate that individual names and/or individual DOBs of the print instruction are to be printed into respective name fields of the first wristband and the second wristband.

In some implementations, the wristband printer is configured to print the content to the set of wristbands based on one or more print markings on the set of wristbands (and/or on the wristband web). For example, during a print operation, the wristband print, via a sensor, may identify a print marking on the wristband web. Based on detecting the print marking, the wristband printer may be configured, according to information from the cartridge, to print certain portions of content from a print instruction to corresponding fields on print surfaces of the wristbands. Accordingly, based on identifying the print marking, the wristband printer may determine a print area and/or print field(s) of the set of wristbands, and print the corresponding portions of the content to the corresponding fields of the wristbands. In this way, as shown in FIG. 4, the wristband printer may print the relationship identifier to both "Family ID" fields of the set of wristbands, the adult name to the "Name" field of the first wristband (which is sized for an adult), the adult DOB to the "DOB" field of the first wristband, the infant name to the "Name" field of the second wristband (which is sized for an infant), and the infant DOB to the "DOB" field of the second wristband.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
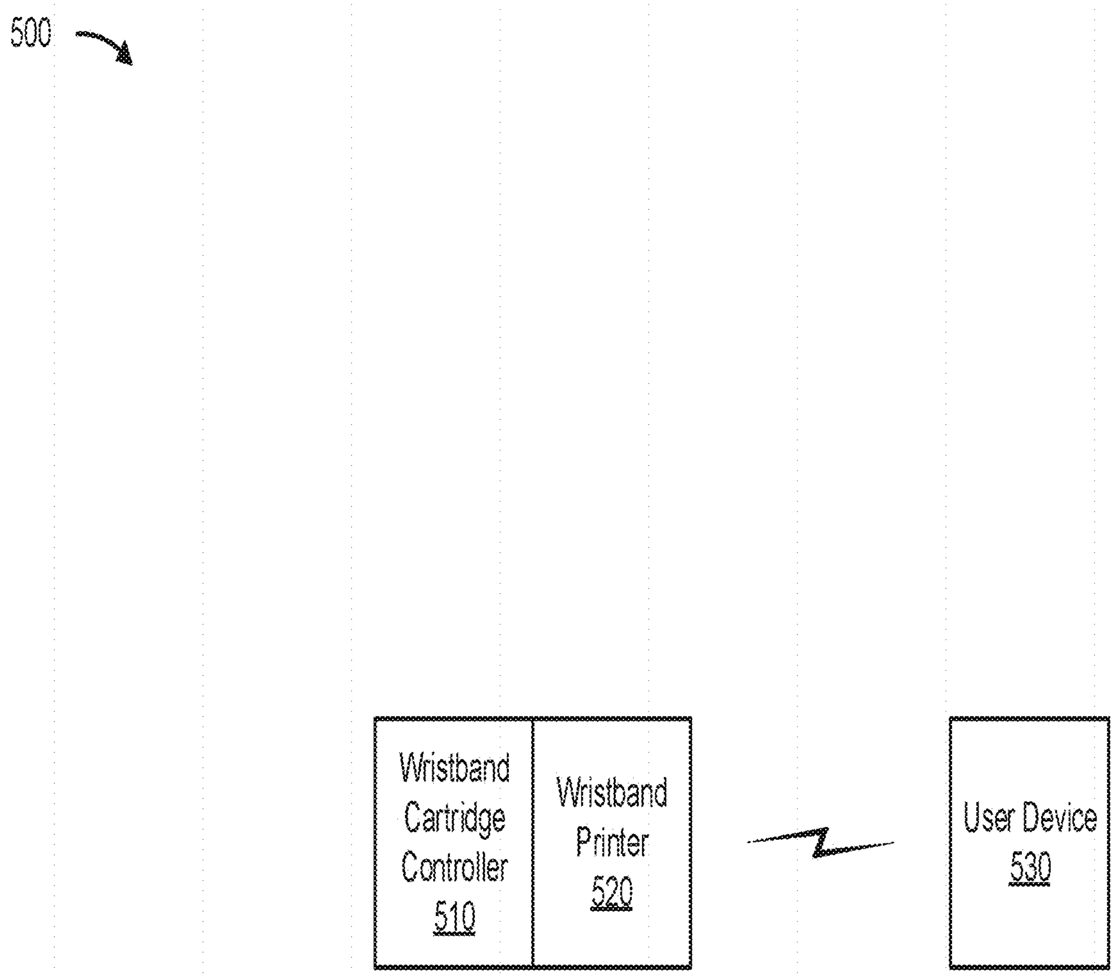
FIG. 5 is a diagram of an example environment in which systems and/or methods associated with a set of wristbands described herein may be implemented.

FIG. 5 is a diagram of an example environment 500 in which systems and/or methods described herein may be implemented. As shown in FIG. 5, environment 500 may include a wristband cartridge controller 510, a wristband printer 520, and a user device 530. Devices of environment 500 may interconnect via wired connections, wireless connections, or a combination of wired and wireless connections.

The wristband cartridge controller 510 includes one or more components capable of receiving, generating, storing, processing, and/or providing information associated with printing to a set of wristbands of a wristband cartridge that are arranged as described elsewhere herein. The wristband printer 520 may include one or more components capable of receiving, generating, storing, processing, and/or printing information on a set of wristbands according to information provided by the wristband cartridge controller 510, as described elsewhere herein.

The user device 530 includes one or more devices capable of receiving, generating, storing, processing, and/or providing information associated with printing to and/or assembling a set of wristbands, as described elsewhere herein. The user device 530 may include a communication device and/or a computing device. For example, the user device 530 may include a wireless communication device, a mobile phone, a user equipment, a laptop computer, a tablet computer, a desktop computer, or a similar type of device.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
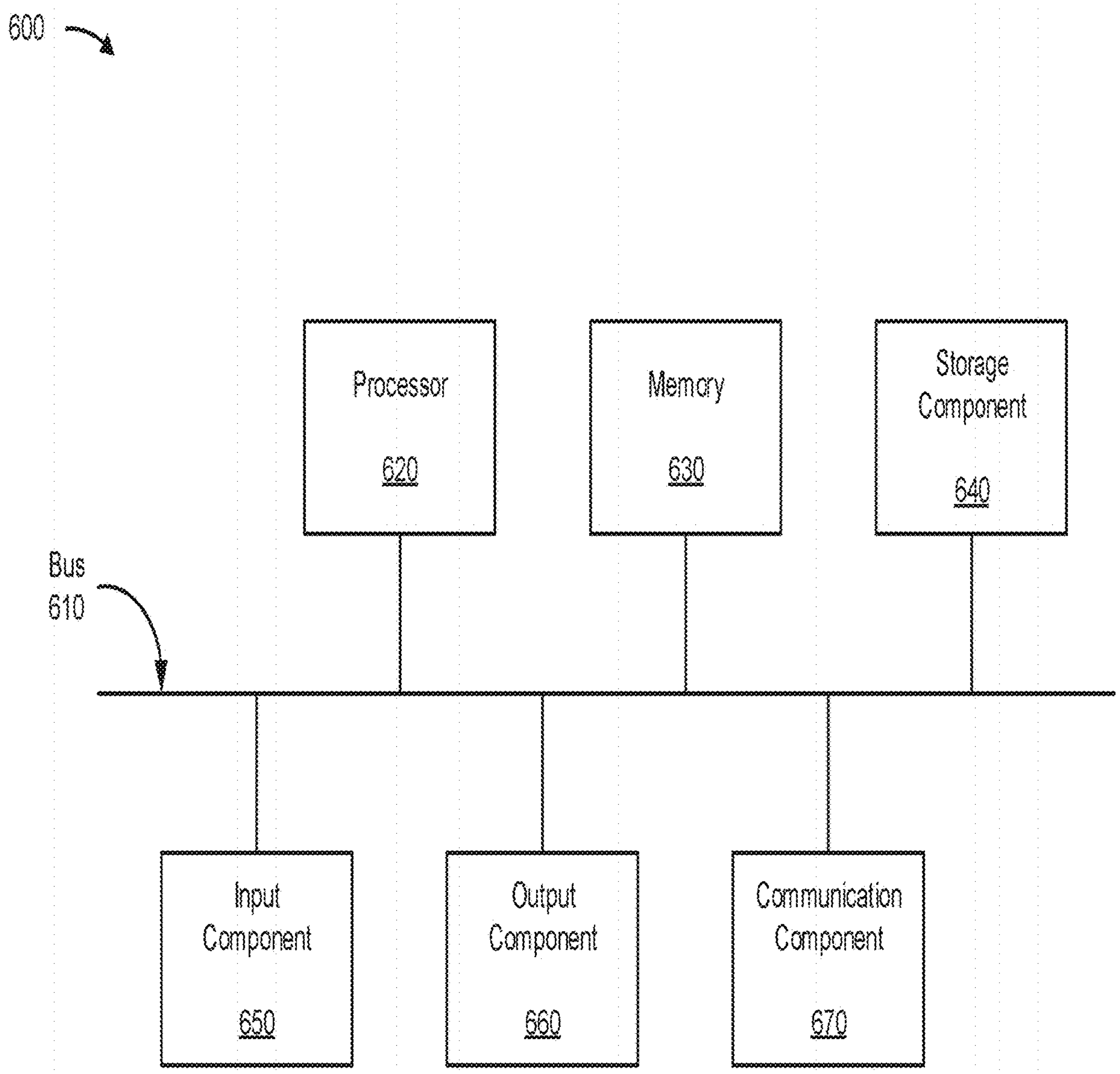
FIG. 6 is a diagram of example components of one or more devices of FIG. 4.

FIG. 6 is a diagram of example components of a device 600, which may correspond to wristband cartridge controller 510, the wristband printer 520 and/or the user device 530. In some implementations, the wristband cartridge controller 510, the wristband printer 520 and/or the user device 530 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
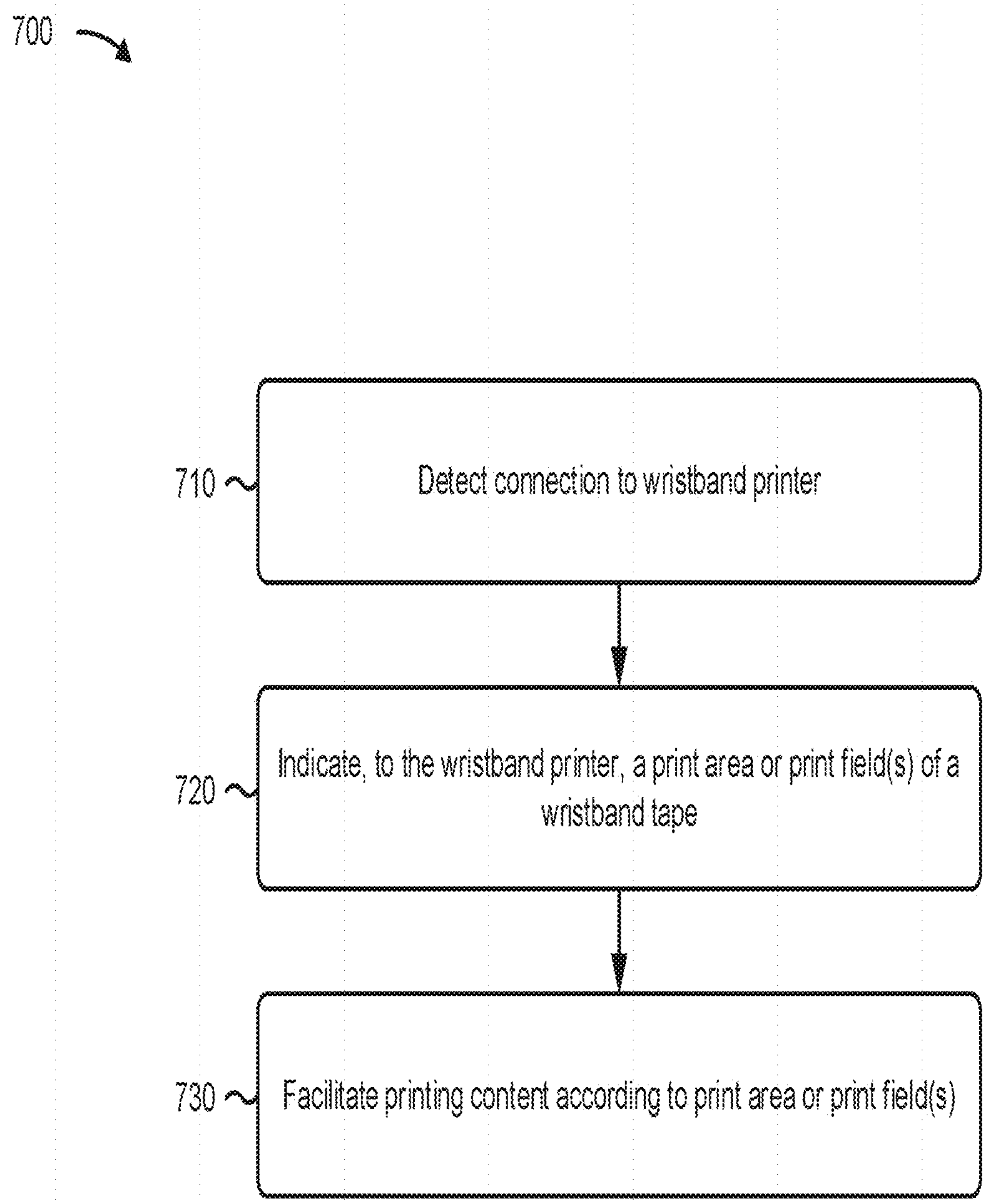
FIG. 7 is a flowchart of an example processes relating to an assembly of a set of wristbands described herein.

FIG. 7 is a flowchart of an example process 700 associated with an assembly of a set of wristbands described herein. In some implementations, one or more process blocks of FIG. 7 may be performed by a controller (e.g., wristband cartridge controller 510). In some implementations, one or more process blocks of FIG. 7 may be performed by another device or a group of devices separate from or including the controller, such as a wristband printer (e.g., the wristband printer 520) and/or a user device (e.g., the user device 530). Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include detecting a connection to a wristband printer (block 710). For example, the wristband cartridge controller may detect the connection to the wristband printer based on being installed within the wristband printer.

As further shown in FIG. 7, process 700 may include indicating, to the wristband printer, a print area or print field(s) of a wristband web (block 720). For example, the wristband cartridge controller may indicate, according to one or more print markings on the wristband web, a print area and/or print fields that are associated with a set of wristbands associated with the one or more print markings. The set of wristbands may include two wristbands that have different lengths, as described above.

As further shown in FIG. 7, process 700 may include facilitating printing content according to the print area and/or print fields (block 730). For example, the wristband cartridge controller may cause and/or enable the wristband printer to output a set of wristbands that include portions of content that are the same (e.g., a relationship identifier) and portions of content that are different according to a single print instruction, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

Some implementations may be described herein to include a parallel relationship or a perpendicular relationship. As used herein, "parallel" corresponds to substantially parallel, such that parallel elements (e.g., parallel planes and/or parallel surfaces associated with one or more items or features described herein) are considered to be parallel according to a design tolerance, a manufacturing tolerance, and/or an industry standard. Similarly, as used herein, "perpendicular" corresponds to substantially perpendicular. Accordingly, perpendicular elements are considered to be perpendicular according to a design tolerance, a manufacturing tolerance, and/or an industry standard.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wristband web arrangement, comprising:

a plurality of wristbands arranged end-to-end in a single file to form a continuous web, the plurality of wristbands alternating along a length of the continuous web between a first subset of wristbands having a first length and a second subset of wristbands having a second length;

a plurality of cut formations formed in the wristband web, the plurality of cut formations being formed between ends of adjacent ones of the first subset of wristbands and the second subset of wristbands;

a plurality of adhesive sections formed on the continuous web; and a plurality of print markings spaced along a length of the continuous web that indicate print areas of the plurality of wristbands, each print marking in at least a subset of the plurality of print markings being separated along the length of the continuous web by two or more of the adhesive sections of the plurality of adhesive sections and being separated by two or more of the plurality of cut formations such that at least one of the first subset of wristbands or the second subset of wristbands is devoid of the plurality of print markings and the plurality of print marking indicate a first one of the print areas on the first subset of wristbands and a second one of the print areas on the second subset of the wristbands.

2. The wristband web arrangement of claim 1, wherein the at least a subset of the plurality of print markings are disposed proximate to leading edges of the first subset of wristbands and the second subset of wristbands is devoid of the plurality of print markings.

3. The wristband web of claim 1 wherein the at least a subset of the plurality of print markings a spaced along the continuous web to skip the second subset of the wristbands.

4. The wristband web od claim 1, wherein the plurality of cut formations define a separation point between the first subset of wristbands and the second subset of wristbands.

5. The wristband web arrangement of claim 1, wherein the first one of the print areas includes a first print surface and the second one of the print areas includes a second print surface.

6. The wristband web arrangement of claim 1, wherein the plurality of wristbands include a first edge contour extending along the length of the continuous web and a second edge contour extending along the length of the continuous web, wherein the first edge contour defines a maximum first wristband width and the second edge contour defines a minimum first wristband width, wherein the minimum first wristband width is less than the maximum first wristband width.

7. A wristband web arrangement, comprising:

a plurality of wristbands arranged end-to-end in a single file to form a continuous web, the plurality of wristbands alternating along a length of the continuous web between a first subset of wristbands having a first length and a second subset of wristbands having a second length;

a plurality of cut formations formed in the wristband web, the plurality of cut formations being formed between ends of adjacent ones of the first subset of wristbands and the second subset of wristbands; and a plurality of print markings spaced along a length of the continuous web that indicate print areas of the plurality of wristbands, each print marking in at least a subset of the plurality of print markings being separated along the length of the continuous web two or more of the plurality of cut formations such that at least one of the first subset of wristbands or the second subset of wristbands is devoid of the plurality of print markings and the plurality of print marking indicate a first one of the print areas on the first subset of wristbands and a second one of the print areas on the second subset of the wristbands, wherein the plurality of wristbands include a first edge contour extending along the length of the continuous web and a second edge contour extending along the length of the continuous web, wherein the first edge contour defines a maximum first wristband width and the second edge contour defines a minimum first wristband width, wherein the minimum first wristband width is less than the maximum first wristband width, and wherein the plurality of wristbands include an adhesive section that is narrower than the maximum first wristband width.

8. An apparatus, comprising:

a cartridge;

a continuous web of wristbands disposed in the cartridge, the continuous web of wristbands including:

a plurality of wristbands arranged end-to-end in a single file to form a continuous web, the plurality of wristbands alternating along a length of the continuous web between a first subset of wristbands having a first length and a second subset of wristbands having a second length;

a plurality of cut formations formed in the wristband web, the plurality of cut formations being formed between ends of adjacent ones of the first subset of wristbands and the second subset of wristbands;

a plurality of adhesive sections formed on the continuous web; and a plurality of print markings spaced along a length of the continuous web that indicate print areas of the plurality of wristbands, each print marking in at least a subset of the plurality of print markings being separated along the length of the continuous web by two or more of the adhesive sections of the plurality of adhesive sections and being separated by two or more of the plurality of cut formations such that at least one of the first subset of wristbands or the second subset of wristbands is devoid of the plurality of print markings and the plurality of print marking indicate a first one of the print areas on the first subset of wristbands and a second one of the print areas on the second subset of the wristbands.

9. The apparatus of claim 8, wherein the at least a subset of the plurality of print markings are disposed proximate to leading edges of the first subset of wristbands and the second subset of wristbands is devoid of the plurality of print markings.

10. The apparatus of claim 8, wherein the at least a subset of the plurality of print markings a spaced along the continuous web to skip the second subset of the wristbands.

11. The apparatus of claim 8, wherein the plurality of cut formations define a separation point between the first subset of wristbands and the second subset of wristbands.

12. The apparatus of claim 8, wherein the first one of the print areas includes a first print surface and the second one of the print areas includes a second print surface.

13. The apparatus of claim 8, wherein the plurality of wristbands include a first edge contour extending along the length of the continuous web and a second edge contour extending along the length of the continuous web, wherein the first edge contour and the second edge contour define a maximum first wristband width and a minimum first wristband width, wherein the minimum first wristband width is less than the maximum first wristband width.

14. The apparatus of claim 13, wherein each adhesive section of the plurality of adhesive sections is narrower than the maximum first wristband width.

* * * * *